United States Patent [19]

Watarai et al.

[11] 4,360,660
[45] Nov. 23, 1982

[54] TRIPHENYLMETHANE POLYMER, PROCESS FOR PRODUCTION THEREOF, AND PHOTOCONDUCTIVE COMPOSITIONS AND MEMBERS FORMED THEREFROM

[75] Inventors: Shu Watarai; Kazuo Ishii; Takeshi Takayama, all of Asaka, Japan

[73] Assignee: Fuji Photo Film Co., Ltd., Kanagawa, Japan

[21] Appl. No.: 218,227

[22] Filed: Dec. 19, 1980

[30] Foreign Application Priority Data

Dec. 22, 1979 [JP] Japan .................................. 54-166306
May 16, 1980 [JP] Japan .................................. 55-65052

[51] Int. Cl.³ .............................................. C08G 12/08
[52] U.S. Cl. ........................................ 528/266; 430/72
[58] Field of Search ................ 528/266, 242; 430/72; 260/389, 390

[56] References Cited

U.S. PATENT DOCUMENTS 3,542,544 11/1970 Sells et al. .............................. 430/74
3,542,547 11/1970 Wilson .................................. 430/74

FOREIGN PATENT DOCUMENTS 56-30159 7/1981 Japan .

OTHER PUBLICATIONS

Research Disclosure 19014, Feb. 1980, (pp. 79-84).

Primary Examiner—Theodore E. Pertilla
Attorney, Agent, or Firm—Sughrue, Mion, Zinn, Macpeak & Seas

[57] ABSTRACT

A triphenylmethane polymer, a process for production thereof, and photoconductive compositions and a member containing the polymer are described; the polymer is represented by formula (I)

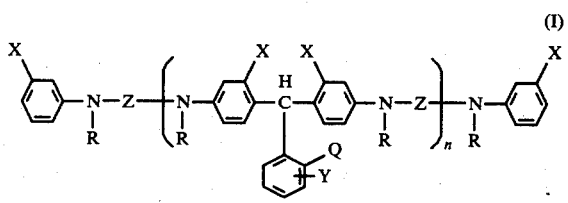

wherein R is an alkyl group, X is H or a methyl group, Z is an alkylene group or a p-xylylene group, Y is H, a methyl group, a methoxy group, a tertiary amino group, halogen, a nitro group or a cyano group, Q is H or a methyl group, and n represents a polymerization degree sufficient to obtain the intrinsic viscosity [η] of the polymer from 0.005 to 1.000.

16 Claims, No Drawings

TRIPHENYLMETHANE POLYMER, PROCESS FOR PRODUCTION THEREOF, AND PHOTOCONDUCTIVE COMPOSITIONS AND MEMBERS FORMED THEREFROM

BACKGROUND OF THE INVENTION

This invention relates to a novel triphenylmethane polymer, an electrophotographic photoconductive composition and a member containing the triphenylmethane polymer.

Various photoconductive substances have heretofore been used in electrophotography. Of these photoconductive substances, organic photoconductive substances are particularly widely used. Typical examples of such photoconductive substances include triphenylamine-based compounds, triphenylmethane-based compounds, etc. For example, U.S. Pat. Nos. 3,542,544 and 3,542,547 disclose that such triphenylmethane-based compounds can be used as photoconductive compounds. These triphenylmethane-based compounds are incorporated in combination with sensitizing dyes into a binder such as polycarbonate and used. The leuco compound and the binder, such as polycarbonate, form an electric carrier transport layer, and the dye-aggregate forms an electric charge-producing layer.

Leuco compounds conventionally used, however, are somewhat soluble in petroleum solvents which are solvents for liquid developers. Therefore, they may migrate from the electric charge transfer layer, changing the construction and performance of the layer. This is a serious disadvantage which should be improved.

In order to employ the above described triphenylmethane-based compounds in the electrophoresis photographic process (PEP process), their leuco compounds were dispersed in polycarbonate to prepare the fine particles thereof, but the leuco compounds eluted in petroleum solvents used in the ink dispersion for electrophoresis. It has thus been confirmed that it is difficult to prepare an ink having a preferred composition from the triphenylmethane-based compounds and that it is not possible to employ the triphenylmethane-based compounds in the electrophoresis photographic process.

U.S. Pat. No. 3,660,083 also discloses that the leuco compound can be chemically bonded to the terminal of a polycarbonate oligomer to prevent the exudation of the leuco compound. A leuco compound so chemically bonded, however, is insufficient in the electric carrier transport ability, and, moreover, its preparation is complicated. It is, therefore, difficult to control the triphenylmethane structure content in the polymer, said triphenylmethane structure having the electric carrier transport ability.

As a result of extensive investigations to remove the above described defects of the heretofore known photoconductive substances, the inventors have succeeded in synthesizing a novel triphenylmethane polymer which has the structure resulting from polymerization of triphenylmethane and is a photoconductive polymer having excellent photoconductivity and other desirable characteristics.

SUMMARY OF THE INVENTION

An object of this invention is to provide a novel polymer having excellent photoconductivity, a composition and a member containing the polymer.

Another object of this invention is to provide a novel polymer which is insoluble in a petroleum solvent and is excellent in film-forming properties, a composition and a member containing the polymer.

Therefore, in accordance with the present invention, the photoconductive polymer of this invention is a triphenylmethane polymer represented by Formula (I):

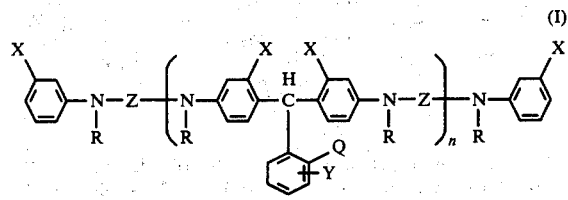

wherein R is an alkyl group, X is H or a methyl group, Z is an alkylene group or a p-xylylene group, Y is H, a methyl group, a methoxy group, a tertiary amino group, halogen, a nitro group or a cyano group, Q is H or a methyl group, and n represents a polymerization degree sufficient to obtain the intrinsic viscosity $[\eta]$ of the polymer from 0.005 to 1.000.

DETAILED DESCRIPTION OF THE INVENTION

The alkyl group represented by R preferably contains from 1 to 5 carbon atoms, and more preferably 1 to 3 carbon atoms. Examples are a methyl group, an ethyl group, a propyl group, etc.

Of the groups represented by Z, the alkylene group preferably contains from 1 to 5 carbon atoms, and more preferably 2 or 3 carbon atoms. Examples are an ethylene group, a propylene group, etc. It may be an alkylene group having a side chain or chains, such as an isopropylene group and an isobutylene group, so long as its number of carbon atoms is within the range as described above.

Of the groups represented by Y, the tertiary amino group is preferably an amino group substituted by an alkyl group containing 1 or 2 carbon atoms. Examples are a diethylamino group, a dimethylamino group, etc. The halogen represented by Y includes fluorine, chlorine, iodine and bromine. Of these elements, chlorine and bromine are preferred. Y may be present at any of the ortho-, meta- and para-positions.

n represents a polymerization degree sufficient to obtain the intrinsic viscosity $[\eta]$ of the polymer from 0.005 to 1.000, preferably from 0.008 to 0.800, more preferably from 0.010 to 0.500 in N,N-dimethylformamide at 25° C.

It is generally difficult to synthesize those polymers in which the triarylmethane-based compound is linked to the side chain of a vinyl polymer, because the triarylmethane-based compound is easily oxidized.

In accordance with this invention, the above described triphenylmethane-based compound is synthesized by a polycondensation method in which the polymer chain is grown while at the same time forming the triphenylmethane skelton. That is, the polymer of this invention is synthesized by condensation of an N,N'-substituted alkylenebisaniline derivative and aldehyde, as shown below.

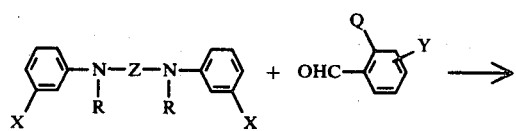  (I)

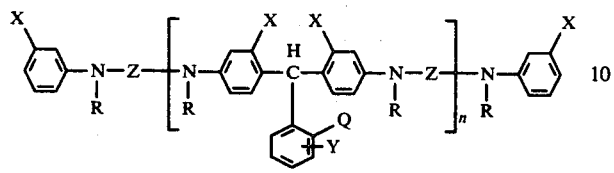

Of the triphenylmethane polymers of this invention, preferred examples are shown in Table 1, within Q, X, R, Y and Z are the same as described in Formula (I).

wherein Y is linked at the ortho- or meta-position can similarly be synthesized and used in this invention.

As the N,N'-substituted alkylenebisaniline derivative which is one of the starting materials for production of the triphenylmethane polymers of this invention, a compound represented by Formula (II) is used.

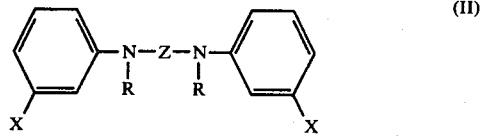  (II)

wherein R, Z and X are the same as described in Formula (I).

Examples of these N,N'-substituted alkylenebisaniline derivatives include N,N'-dimethyl-N,N'-diphenyle-

TABLE 1

| Polymer | X | R | Q | Y | Z |
|---|---|---|---|---|---|
| I-1 | —H | —CH₃ | —H | p-N(CH₃)₂ | —(CH₂)₂— |
| 2 | —CH₃ | —C₂H₅ | " | p-N(CH₃)₂ | " |
| 3 | —H | —CH₃ | " | p-OCH₃ | " |
| 4 | " | " | " | p-NO₂ | " |
| 5 | " | " | " | p-H | " |
| 6 | " | —C₂H₅ | " | p-N(CH₃)₂ | " |
| 7 | " | " | " | p-OCH₃ | " |
| 8 | " | " | " | p-CH₃ | " |
| 9 | " | " | " | p-Cl | " |
| 10 | " | " | " | p-Br | " |
| 11 | " | " | " | p-CN | " |
| 12 | " | " | " | p-NO₂ | " |
| 13 | " | " | " | p-H | " |
| 14 | —CH₃ | —CH₃ | " | p-N(CH₃)₂ | " |
| 15 | " | " | " | p-OCH₃ | " |
| 16 | " | " | " | p-H | " |
| 17 | " | " | " | p-Cl | " |
| 18 | " | " | " | p-CN | " |
| 19 | " | " | " | p-NO₂ | " |
| 20 | " | —C₂H₅ | " | p-H | " |
| 21 | " | " | " | p-OCH₃ | " |
| 22 | " | " | " | p-Cl | " |
| 23 | " | " | " | p-NO₂ | " |
| 24 | " | " | " | p-N(CH₃)₂ | —(CH₂)₃— |
| 25 | " | " | " | " | —CH₂—⟨⟩—CH₂— |
| 26 | —H | " | " | " | " |
| 27 | " | " | " | " | —(CH₂)₃— |
| 28 | —CH₃ | —CH₃ | " | " | —(CH₂)₃— |
| 29 | " | —C₂H₅ | " | " | —CH₂—⟨⟩—CH₂— |
| 30 | —H | " | " | o-OCH₃ | —(CH₂)₂— |
| 31 | " | —C₂H₅ | " | m-OCH₃ | " |
| 32 | " | " | " | o-Cl | " |
| 33 | " | " | " | m-Cl | " |
| 34 | " | " | " | m-NO₂ | " |
| 35 | " | " | " | o-CH₃ | " |
| 36 | —CH₃ | " | —CH₃ | p-N(C₂H₅)₂ | —CH₂CH₂— |
| 37 | " | " | " | p-N(CH₃)₂ | " |
| 38 | " | " | " | " | —CH₂—⟨⟩—CH₂— |
| 39 | " | —CH₃ | " | p-N(C₂H₅)₂ | —CH₂CH₂— |
| 40 | " | —C₂H₅ | " | " | —CH₂CH₂CH₂— |
| 41 | —H | —CH₃ | " | " | —CH₂CH₂— |
| 42 | " | —C₂H₅ | " | " | " |

In Table 1 above, in many of the polymers Y is linked at the para-position. However, those compounds thylenediamine (Compound II-1), N,N'-dimethyl-N,N'-diphenylpropylenediamine (Compound II-2), N,N'- diethyl-N,N'-diphenylethylenediamine (Compound II-3), N,N'-diethyl-N,N'-diphenylpropylenediamine (Compound II-4), N,N'-dimethyl-N,N'-di(m-tolyl)ethylenediamine (Compound II-5), N,N'-diethyl-N,N'-di(m-tolyl)ethylenediamine (Compound II-6), N,N'-diethyl-N,N'-di(m-tolyl)propylenediamine (Compound II-7), N,N'-diethyl-N,N'-di(m-tolyl)xylylenediamine (Compound II-8), N,N'-dimethyl-N,N'-di(m-tolyl)-propylenediamine (Compound II-9), etc.

These N,N'-alkylenebisaniline derivatives can be synthesized, as illustrated below, from aniline derivatives and alkylene halide in the presence of sodium carbonate as a catalyst according to the methods as described in W. R. Boom, *Journal of Chemical Society*, 307 (1947) and P. W. Hickmott, *Journal of Chemical Society* (C), 666 (1966).

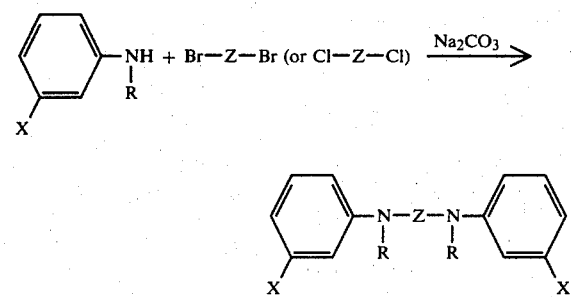

wherein R, X and Z are the same as described in Formula (I).

The yields and melting points or boiling points of Compounds II-1 to II-9 synthesized according to the above described method are shown in Table 2.

(dimethylamino)benzaldehyde, methoxybenzaldehyde, nitrobenzaldehyde, cyanobenzaldehyde, chlorobenzaldehyde, bromobenzaldehyde and tolualdehyde. These aldehydes are available on the market. Additionally, those compounds prepared by formylating dialkyl-metatoluidine, e.g., diethylmethatoluidine, dimethylmetatoluidine, etc., by the Vilsmeier reaction according to the method as described in H. H. Bosshard et al., *Helvetica Chimica Acta*, vol. 42, 1653 (1959), ibid, vol. 42, 1659 (1959) can be used.

It is most suitable to carry out the reaction of N,N'-alkylenebisaniline of Formula (II) and aldehyde of Formula (III) in polyphosphoric acid, which acts as a solvent and at the same time, as a dehydration-condensation catalyst, in that oxidation can be prevented and the reaction can be uniformly carried out under mild conditions. The reaction temperature is from 50° to 200° C., and preferably from 100° to 150° C., and the reaction period is from 10 minutes to 20 hours, and preferably from 1 hour to 8 hours. With regard to the ratio of N,N'-alkylenebisaniline to aldehyde, the reaction proceeds smoothly at a ratio of 0.8 to 1.2 moles of aldehyde per mole of N,N'-alkylenebisaniline, but they are generally reacted in equimolar amounts. The amount of polyphosphoric acid added is from 5 to 30 g, and preferably from 8 to 15 g per gram of N,N'-alkylenebisaniline.

The polyphosphoric acid is a mixture of orthophosphoric acid, pyrophosphoric acid, tripolyphosphoric acid and other phosphoric acid condensates, and is obtained by heat-condensation of orthophosphoric acid. The concentration of the polyphosphoric acid is expressed in terms of % by weight of $P_2O_5$ based upon 100% by weight of the total weight of the phosphoric acid condensate mixture. The concentration of the polyphosphoric acid as used in this invention is subject to no

TABLE 2

| N,N'—substituted alkylenebis-anilines | R | X | Z | Yield (%) | Melting Point (°C.) (figures in parenthesis indicate boiling point °C./mm Hg) |
|---|---|---|---|---|---|
| II-1 | —$CH_3$ | —H | —$(CH_2)_2$— | 81 | ($120/10^{-3}$) |
| 2 | —$CH_3$ | —H | —$(CH_2)_3$— | 71 | ($122/10^{-3}$) |
| 3 | —$C_2H_5$ | —H | —$(CH_2)_2$— | 85 | 74 |
| 4 | —$C_2H_5$ | —H | —$(CH_2)_3$— | 81 | 41 |
| 5 | —$CH_3$ | —$CH_3$ | —$(CH_2)_2$— | 42 | ($160/10^{-3}$) |
| 6 | —$C_2H_5$ | —$CH_3$ | —$(CH_2)_2$— | 76 | ($157/10^{-3}$) |
| 7 | —$C_2H_5$ | —$CH_3$ | —$(CH_2)_3$— | 40 | ($155/10^{-3}$) |
| 8 | —$C_2H_5$ | —$CH_3$ | 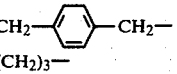 | 90 | 86 |
| 9 | —$C_2H_5$ | —$CH_3$ | —$(CH_2)_3$— | 69 | ($146/10^{-3}$) |

In Table 2 above, R, X, and Z are the same as described in Formula (II).

The other starting material for use in obtaining the polymer of this invention, i.e., the aldehyde, is represented by Formula (III)

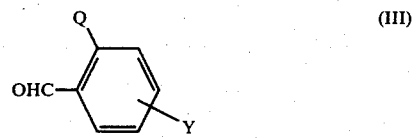

wherein Y and Q are the same as described in Formula (I).

Representative examples of such aldehydes are para-substituted, meta-substituted and ortho-substituted compounds of benzaldehyde, (diethylamino)benzaldehyde, special limitations, but it is preferably from 80 to 120% by weight of $P_2O_5$.

Polyphosphoric acid as used in this invention is further described in E. D. Popp, W. E. McEven, et al., *Chemical Review*, 58, 321 (1956) and *Kagaku Zokan*, 52, P-245 (1972), published by Kagaku Dozin, Japan.

As is apparent from the above explanation, the polymeric substance of this invention has excellent photoconductivity, and furthermore has the advantages that it can provide a coating film having a high toughness and that its heat-fixability when used as photoconductive fine particles is good, and the mechanical strength of the image obtained is good. Thus, the polymeric substance of this invention is very suitable as a material for use in the light-sensitive layer of electrophotographic members. When it is used as the material, as is the case with conventional substances, it is used in combination with various sensitizers such as dyes, other electron accepting substances, etc., other additives and binders.

To an electrophotographic photoconductive composition containing the triphenylmethane polymer of this invention can be added an effective amount of a sensitizing compound. Sensitizing compounds which can be used include pyrylium dyes, fluorene, thiazole, cyanine dyes, carbocyanine dyes, merocyanine dyes, anthraquinone dyes, azo dyes, aromatic nitro compounds, anthrone, quinone and the like as is described in U.S. Pat. Nos. 2,732,301; 2,670,287; 2,670,284; 2,670,286; 3,250,615 and 2,610,120, etc. Preferred sensitizers pyrylium salts, thiapyrylium salts, cyanines, triphenylmethane-based dyes, thiazine dyes, oxazine-based dyes and the like. In more detail, Thioflavine, Crystal Violet, Rhodamine B, Brilliant Red, Methylene Blue, etc. are preferably used.

The amount of the sensitizer added is preferably from 0.0001 to 30% by weight based on the total weight of the photoconductive composition (dry basis), with the range of from 0.005 to 10% by weight being especially preferred.

Since the triphenylmethane polymer per se of this invention is excellent in the film-forming properties, addition of binders other than the polymer of this invention is not necessarily required. If desired, however, a film-forming binder having electric insulating properties can be added to the photoconductive composition of this invention.

Examples of such film-forming binders include gelatin; cellulose ester derivatives, e.g., carboxymethyl cellulose, etc.; polyvinyl chloride; vinylidene chloride copolymers, e.g., a vinylidene chloride-vinyl isobutyl ether copolymer, etc.; polystyrene; a styrene-monoisobutyl maleate copolymer; a styrene-methacrylic acid copolymer; a vinyl acetate polymer; a vinyl acetate-maleic acid copolymer; a styrene-buadiene copolymer; polymethacrylate; polyvinyl acetals, e.g., polyvinyl butyral, etc.; chlorinated polyethylene; chlorinated polypropylene; polycarbonate, e.g., polycarbonate of 2,2-bis(4-hydroxyphenyl)-propane; polythiocarbonate; polyamide; polyester, e.g., polyester of terephthalic acid, 2,2-bis[4-($\beta$-hydroxyethoxy)phenyl]propane and ethylene glycol; a phenolformaldehyde resin, a styrene-alkyd resin; and the like. Additionally, mineral wax, paraffin, etc. can be used.

The film-forming polymer can be added until the amount of the triphenylmethane polymer in the dry composition reaches at least 1% by weight. Preferably the triphenylmethane polymer is contained in an amount of 10% by weight or more, and more preferably in an amount of 30% by weight or more.

In preparing the photoconductive composition containing the triphenylmethane polymer of this invention, a solvent is generally used to uniformly mix the triphenylmethane polymer and other additives. Examples of useful solvents include dichloroethane, dichloromethane, chloroform, tetrahydrofuran, dioxane, N,N-dimethylformamide, N-methylpyrrolidone, etc. Additionally, various additives such as surface active agents, plasticizers, etc. can be added to the photoconductive composition.

The photoconductive composition of this invention is coated on an electrically conductive support or a support subjected to a treatment to make it electrically conductive, to prepare a photoconductive light-sensitive member. Suitable examples of supports on which the photoconductive layer can be coated include a paper subjected to the treatment to make electrically conductive, metal foils such as an aluminum foil, a zinc foil, etc., metal plates of aluminum, zinc, copper and the like, an aluminum-paper laminate, and supports prepared by depositing aluminum, silver, nickel or the like on photographic film bases such as polyethylene terephthalate, paper, cellulose acetate, etc.

The thickness of the photoconductive composition coated on the support is, as a dry thickness, 1 to 300 microns, and preferably 2 to 60 microns.

When the photoconductive composition containing the photoconductive polymeric substance is used to prepare an electrophotographic light-sensitive member, the electrophotographic light-sensitive member can the form, e.g., of the following embodiments (i) and (ii):

(i) A solution of the polymeric substance of this invention is coated on an electrically conductive support, e.g., a metal plate, a paper and a plastic film made electrically conductive, etc., and fully dried to prepare an electrophotographic member. This electrophotographic member is uniformly charged, for example, in a dark place and imagewise exposed according to the usual electrophotographic method and thereafter it is developed by a suitable developing method, for example, the cascade developing method or the liquid developing method to form the desired image.

(ii) In this embodiment, the polymeric substance is used as fine particles. For example, the polymeric substance per se or a mixture of the polymeric substance and about 50% by weight or less, based upon the weight of polymeric substance, of a sensitizer is dissolved in a solvent which has a lower boiling point and is capable of dissolving both the polymeric substance and the sensitizer, such as dichloromethane, dichloroethane, chloroform, benzene, etc. The resulting solution is then poured with stirring into an insulative petroleum solvent, such as hexane, heptane, kerosene, isoparaffine, etc. to form light-sensitive particles of a diameter of 0.05 to 20 $\mu$m.

These light-sensitive particles are used, for example as a solution, in an electrophoresis process as described in Japanese Patent Publication No. 21781/1968 to provide an image.

SYNTHESIS EXAMPLE 1

Preparation of
2-Methyl-4-(dimethylamino)benzaldehyde 146 g of N,N-Dimethylformamide (DMF) was placed in a three neck flask and cooled down to 0° C., and on dropwise adding 306 g of phosphorous oxychloride with stirring over a period of 1 hour, it became beeswax-like. A solution prepared by dissolving 270 g of dimethylmethatoluidine in 200 ml of DMF was dropwise added thereto over a period of 40 minutes, and the resulting mixture was stirred for 5 hours and allowed to stand overnight at room temperature. The reaction mixture was poured into 2 liters of water, and on neutralizing with sodium carbonate, precipitates deposited. These precipitates were fully washed with water and then distilled under reduced pressure to obtain a 110° to 112° C./2 mmHg fraction. This fraction was recrystallized from n-hexane to obtain 130 g of 2-methyl-4-(dimethylamino)benzaldehyde. m.p. 66° to 67° C.

SYNTHESIS EXAMPLE 2

Preparation of 2-Methyl-4-(diethylamino)benzaldehyde

In the same manner as in Synthesis Example 1 except that diethylmethatoluidine was used in place of dimethylmethatoluidine, the reaction was conducted. After the reaction, the neutralized product was extracted with ethyl ether and, thereafter, vacuum-distillation was conducted twice to obtain 2-methyl-4-(diethylamino)-benzaldehyde in a yield of 45%. b.p., 110° to 114° C./1 mmHg.

EXAMPLE 1

Preparation of Triphenylmethane Polymer (I-1)

4.8 g (0.02 mole) of N,N'-dimethyl-N,N'-diphenylethylenediamine (Compound I-1) and 3.0 g (0.02 mole) of para-N,N-dimethylaminobenzaldehyde were added to 50 g of 105% polyphosphoric acid, and the resulting mixture was stirred at 100° C. for 4 hours and then poured into 2 liters of cold water. Upon neutralization of the mixture with an aqueous solution of caustic soda, a polymer deposited as a precipitate. This precipitate was filtered off, fully washed with water and then dired. This reaction product was dissolved in tetrahydrofuran and redeposited in a large amount of methanol to conduct the purification thereof. Reprecipitation using tetrahydrofuran and methanol was repeated three times to obtain 7.2 g (97%) of a somewhat bluish polymer powder.

The intrinsic viscosity [η] of the polymer so obtained in N,N-dimethylformamide at 25° C. was 0.071.

Infrared absorption spectral analysis of the polymer (in a KBr tablet) showed the following main peaks:
740, 790, 805, 830, 940, 1050, 1130, 1200, 1230, 1350, 1440, 1480, 1510, 1560, 1610 (cm$^{-1}$).

Ultraviolet absorption spectral analysis of the polymer in 1,2-dichloroethane showed the following peaks:
272 (absorbancy index, 4×10$^4$), 305 (absorbancy index, 7.7×10$^3$) (nm).

C-13 NMR spectral analysis of the polymer was carried out in deuterochloroform with tetramethylsilane as a basis, and this analysis showed that the absorption to be assigned to the tertiary carbon atom of the triphenylmethane structure was at 54.0 ppm.

The molecular weight of the polymer was measured by gel permeation chromatography. Its number average molecular weight was 7,700, and its weight average molecular weight 19,700, all being calculated on basis of polystyrene. The molecular weight based on polystyrene is obtained according to processes wherein standard samples of polystyrenes having a variety of molecular weights are applied to a gel-permeation chromatography to obtain a graph with molecular weight on the vertical axis and elution volume horizontally, and then the molecular weight of the polymer of the present invention is estimated from the result of the gel-permeation chromatography of the present polymer based on the graph.

In order to confirm the structure of the polymer as obtained above, the analytical data of a compound having formula (IV) are shown below:

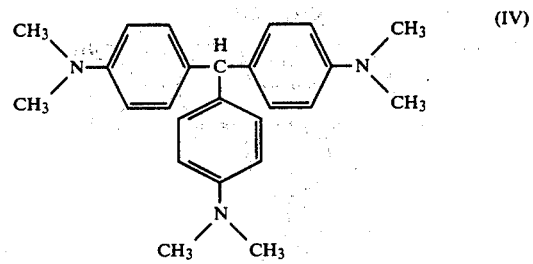

Infrared absorption spectrum (cm$^{-1}$) (KBr):
740, 790, 805, 830, 940, 1060, 1120, 1160, 1200, 1230, 1350, 1440, 1480, 1520, 1560, 1610.

Ultraviolet absorption spectrum (nm) (1,2-dichloroethane):
270 (5.2×10$^4$), 305 (8.1×10$^3$).

C-13 NMR spectral analysis confirmed that the tertiary carbon atom gave a peak at 54.0 ppm.

As a result of a comparative study on the spectral data of the polymer with reference to those of the compound of Formula (IV), it was confirmed that the polymer was Compound (I-1).

EXAMPLE 2

Preparation of Triphenylmethane Polymer (I-2)

59.3 g (0.2 mole) of N,N'-diethyl-N,N'-di(m-tolyl)ethylenediamine (Compound II-6) and 29.8 g (0.2 mole) of para-N,N-dimethylaminobenzaldehyde were placed in 300 g of polyphosphoric acid and heated at 140° C. for 4 hours while stirring. The system became viscous, but when poured into 5 liters of cold water and fully stirred, it was completely dissolved therein. On neutralizing the resulting solution by adding a concentrated aqueous solution of caustic soda, a polymer deposited as a precipitate. The precipitate so obtained was filtered off, fully washed with water, and then dried. Therefore, it was dissolved in tetrahydrofuran and reprecipitated in methanol. This treatment was repeated three times to obtain a whitish grey polymer in a yield of 80%.

The intrinsic viscosity [η] of the polymer so obtained in N,N-dimethylformamide at 25° C. was 0.273.

Infrared absorption spectral analysis showed the following peaks:
795, 840, 950, 1050, 1100, 1160, 1200, 1350, 1450, 1480, 1500, 1560, 1610 (cm$^{-1}$).

Ultraviolet absorption spectral analysis showed the following peaks:
273 (4.1×10$^4$), 306 (8.7×10$^3$) (nm).

C-13 NMR spectram:

47.9 ppm tertiary carbon atom

Number average molecular weight:
14,500

Weight average molecular weight:
40,500

The analytical data on a model compound having formula (V) are as follows:

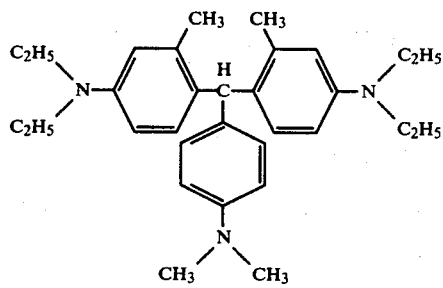

(V)

Infrared absorption spectrum:
790, 830, 950, 1070, 1090, 1160, 1200, 1360, 1450, 1510, 1570, 1610 cm$^{-1}$.
Ultraviolet absorption spectrum:
273 ($5.3 \times 10^4$), 309 ($8.4 \times 10^3$) (nm).
C-13 NMR spectrum:
48.0 ppm tertiary carbon atom A comparative study on the analytical data of the polymer as obtained above with reference to those of the compound of formula (V) confirmed that the polymer was a polymer having the structure of (I-2).

EXAMPLES 3 TO 35

The triphenylmethane polymers as shown in Table 3 were prepared from N,N'-substituted alkylenebisanilines and benzaldehyde or its derivatives as shown in Table 2 instead of N,N'-dimethyl-N,N'-diphenylethylenediamine (Compound II-1) and N,N-dimethylaminobenzaldehyde in the same manner as in Example 1. The results are shown in Table 3.

TABLE 3

| | Viscosity | Ultraviolet absorption spectrum (nm) | |
|---|---|---|---|
| I-3 | 0.023 | 266 | 305 |
| 4 | 0.054 | 274 | 353 |
| 5 | 0.028 | 273 | 306 |
| 6 | 0.070 | 274 | 305 |
| 7 | 0.073 | 268 | 340 |
| 8 | 0.090 | 266 | 292 |
| 9 | 0.071 | 270 | 310 |
| 10 | 0.101 | 273 | 307 |
| 11 | 0.310 | 267 | 300 |
| 12 | 0.100 | 275 | 355 |
| 13 | 0.067 | 268 | 340 |
| 14 | 0.085 | 271 | 306 |
| 15 | 0.066 | 270 | 308 |
| 16 | 0.058 | 269 | 300 |
| 17 | 0.060 | 269 | 307 |
| 18 | 0.358 | insoluble in 1,2-dichloroethane | |
| 19 | 0.068 | 273 | 350 |
| 20 | 0.085 | 277 | 308 |
| 21 | 0.045 | 273 | 310 |
| 22 | 0.013 | 271 | 308 |
| 23 | 0.019 | 276 | 352 |
| 24 | 0.058 | 270 | 305 |
| 25 | 0.119 | 268 | 305 |
| 26 | 0.065 | 263 | 300 |
| 27 | 0.068 | 269 | 300 |
| 28 | 0.088 | 269 | 305 |
| 29 | 0.124 | 264 | 305 |
| 30 | 0.042 | 266 | 340 |
| 31 | 0.059 | 266 | 340 |
| 32 | 0.079 | 275 | 305 |
| 33 | 0.078 | 274 | 308 |
| 34 | 0.079 | 267 | 386 |
| 35 | 0.066 | 266 | 307 |

EXAMPLE 36

Preparation of Triphenylmethane Polymer (I-36)

29.6 g (0.1 mole) of N,N'-diethyl-N,N'-di(m-tolyl)ethylenediamine (Compound II-6) and 19.1 g (0.1 mole) of 2-methyl-4-(diethylamino)benzaldehyde obtained in Synthesis Example 1 were added to 150 g of 105% polyphosphoric acid, stirred at 120° C. for 5 hours and then poured into 2 liters of cold water. On neutralizing the resulting mixture with an aqueous solution of sodium hydroxide, a polymer deposited as a precipitate. This precipitate was filtered off, throughly washed with water and then dried.

The reaction product so obtained was dissolved in 1,2-dichloroethane and reprecipitated by pouring into methanol. Thereafter, reprecipitation using tetrahydrofuran and methanol was conducted to purify the product. Thus, 39 g of a white powder was obtained. The intrinsic viscosity [η] of the polymer in DMF at 25° C. was 0.12.

Infrared absorption spectral analysis of the polymer showed the following main peaks:
780, 830, 1020, 1100, 1200, 1240, 1270, 1350, 1370, 1530, 1565, 1610 (cm$^{-1}$).

Ultraviolet absorption spectral analysis in 1,2-dichloroethane showed:
275 nm (absorbancy index ε: $3.7 \times 10^4$), 310 nm (ε: $2.9 \times 10^4$).

C-13 NMR spectral analysis was carried out in (deutrochloroform with tetramethylsilane as a basis, and this analysis showed that the absorption to be assigned to the tertiary carbon atom of the triphenylmethane structure was at 44.69 ppm.

The molecular weight of the polymer was measured by gel permeation chromatography. Its number average molecular weight was 4,600, and its weight average molecular weight 10,600, all being calculated on basis of polystyrene.

In order to clarify the structure of the polymer, the analytical data on a compound having formula (VI) are shown below:

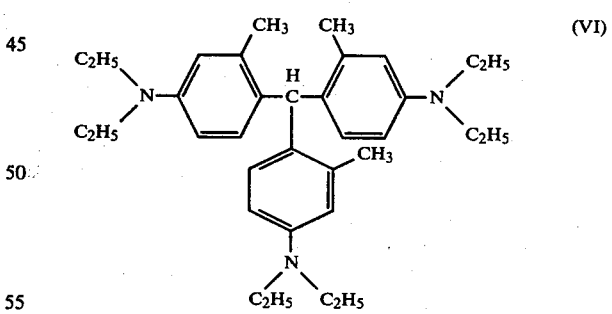

(VI)

Infrared absorption spectrum (cm$^{-1}$) (KBr):
790, 840, 1030, 1100, 1220, 1250, 1270, 1360, 1380, 1510, 1570, 1610.
Ultraviolet absorption spectrum (in 1,2-dichloroethane):
275 nm (ε: $5.4 \times 10^4$), 311 nm (ε: $8.2 \times 10^3$).
C-13 NMR spectrum:
44.69 ppm tertiary carbon atom A comparative study on the data of the polymer with reference to those of Compound (VI) as a model confirmed that the polymer was a polymer represented by Formula (I-36).

EXAMPLES 37 TO 39

Various polymers were prepared from appropriate N,N-substituted alkylenebisanilines and 2-methyl-4-(dialkylamino)benzaldehyde as shown in Table 2 in the same manner as in Example 36. The results are shown in Table 4.

TABLE 4

| Polymer | [η] | Ultraviolet Absorption Spectrum |
|---|---|---|
| I-37 | 0.102 | 272 nm (ε: 3.9 × 10⁴), 305 nm (ε: 7.7 × 10³) |
| I-38 | 0.059 | 267 nm (ε: 4.2 × 10⁴), 300 nm (ε: 9.2 × 10³) |
| I-39 | 0.146 | 277 nm (ε: 4.9 × 10⁴), 311 nm (ε: 8.7 × 10³) |

EXAMPLE 40

A 5% dichloroethane solution of triphenylmethane polymer (I-2) as obtained in Example 2 was coated on an aluminum plate in a dry thickness of about 20 μm and dired to prepare a member for use in photoconductivity testing. This member was charged in a dark place by application of corona discharge (6 KV) and then uniformly exposed to halogen lamp (300 W) to measure the light exposure amount required for reducing the surface potential to a half of the original value (half-decay exposure amount).

| Positive Charging | | Negative Charging | |
|---|---|---|---|
| Initial Potential (V) | Half-decay Exposure Amount lux . sec (E½) | Initial Potential (V) | Half-decay Exposure Amount lux . sec (E½) |
| 450 | $1.3 \times 10^3$ | −570 | $1.3 \times 10^3$ |

With regard to the polymers as shown in Table 5, the initial potential and the half-decay exposure amount were measured. The results are shown in Table 5.

TABLE 5

| | Positive Charging | | Negative Charging | |
|---|---|---|---|---|
| Compound | Initial Potential (V) | Half-decay Exposure Amount lux . sec (E½) | Initial Potential (V) | Half-decay Exposure Amount lux . sec (E½) |
| I-1 | 420 | $4 \times 10^4$ | −480 | $4.8 \times 10^4$ |
| 4 | 360 | $3 \times 10^4$ | −160 | $3 \times 10^4$ |
| 13 | 190 | $1.7 \times 10^5$ | −190 | $2.3 \times 10^5$ |
| 6 | 550 | $1.9 \times 10^4$ | −680 | $1.2 \times 10^4$ |
| 9 | 740 | $2.1 \times 10^3$ | −740 | $2.1 \times 10^3$ |
| 11 | 177 | $2.6 \times 10^3$ | −420 | $2.9 \times 10^3$ |
| 12 | 350 | $6.4 \times 10^4$ | −350 | $1.2 \times 10^4$ |
| 16 | 580 | $2.4 \times 10^5$ | −530 | $2.2 \times 10^5$ |
| 14 | 160 | $1.1 \times 10^3$ | −210 | $1.2 \times 10^3$ |
| 15 | 480 | $1.2 \times 10^5$ | −340 | $1.2 \times 10^5$ |
| 17 | 550 | $4.2 \times 10^3$ | −430 | $2.5 \times 10^3$ |
| 18 | 410 | $8 \times 10^3$ | −490 | $1.9 \times 10^4$ |
| 23 | 276 | $1.4 \times 10^4$ | −165 | $2.3 \times 10^4$ |
| 24 | 390 | $4.1 \times 10^5$ | −400 | $4 \times 10^5$ |
| 29 | 620 | $1.7 \times 10^4$ | −570 | $2.1 \times 10^5$ |
| 26 | 165 | $8.9 \times 10^4$ | −225 | $9.8 \times 10^4$ |
| 28 | 480 | $6 \times 10^4$ | −445 | $5 \times 10^4$ |

EXAMPLE 41

The procedure of Example 40 was repeated with the exception that 0.01 mole% of a sensitizer having formula (VII) as shown below was added to triphenylmethane polymer (I-2). The initial potential and half-decay exposure amount are shown below:

| Positive Charging | | Negative Charging | |
|---|---|---|---|
| Initial Potential (V) | Half-decay Exposure Amount lux . sec | Initial Potential (V) | Half-decay Exposure Amount lux . sec |
| 170 | 84 | −168 | 72 |

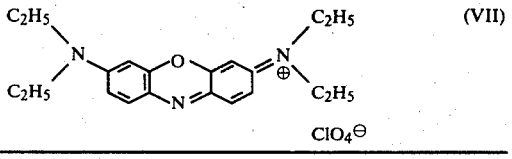

(VII)

EXAMPLE 42

0.77 g (2×10⁻² mole) of triphenylmethane polymer (I-2) as obtained in Example 2, 60 mg of polycarbonate of bisphenol A and 2×10⁻⁴ mole of the sensitizing dye as used in Example 41 were dissolved in dichloroethane to prepare a 5% dichloroethane solution. This solution was coated in the same manner as in Example 40 to prepare a photoconductive member, and its initial potential and half-decay exposure amount were measured. The results are shown below.

| Positive Charging | | Negative Charging | |
|---|---|---|---|
| Initial Potential (V) | Half-decay Exposure Amount lux . sec | Initial Potential (V) | Half-decay Exposure Amount lux . sec |
| 168 | 64 | −183 | 68 |

EXAMPLE 43

A 5% dichloroethane solution of polymer (I-36) as obtained in Example 36 and 0.01 mole% of a sensitizing dye of formula (VIII) as shown below was coated on an aluminum plate and dried to prepare a photoconductive member (dry thickness 6 μm).

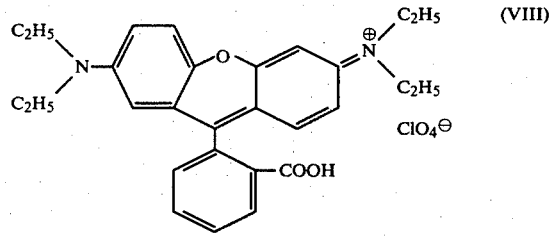

(VIII)

This member was charged in a dark place by application of corona discharge (6 KV) and then its whole surface was exposed to light while controlling the quantity of the light from a halogen lamp (300 W) with a ND filter (Neutral Density filter), to measure the light exposure amount required for reducing the surface potential to a half of the original.

| Positive Charging | | Negative Charging | |
|---|---|---|---|
| Initial Potential (V) | Half-decay Exposure Amount E½ (lux . sec) | Initial Potential (V) | Half-decay Exposure Amount E½ (lux . sec) |
| 330 | 220 | 360 | 190 |

EXAMPLE 44

By using 0.38 g of polymer (I-36), 0.25 g of polycarbonate of bisphenol A, and 1.09 mg of the same sensitizing dye as used in Example 43, a photoconductive member was prepared in the same manner as in Example 43. Its initial potential and exposure amount were measured, and the results are shown below.

| Positive Charging | | Negative Charging | |
| --- | --- | --- | --- |
| Initial Potential (V) | E½ (lux . sec) | Initial Potential (V) | E½ (lux . sec) |
| 240 | 200 | 330 | 160 |

EXAMPLE 45

With the polymers as shown in Table 4, the photoconductivity was measured in the same manner as in Example 43 or 44. The results are shown in Table 6.

TABLE 6

| Polymer | Polycarbonate | Dye (V) | Positive Charging | | Negative Charging | |
| --- | --- | --- | --- | --- | --- | --- |
| | | | Initial Potential (V) | E½ (lux . sec) | Initial Potential (V) | E½ (lux . sec) |
| I-2 | | | | | | |
| | 0.86 g | none | 2.17 mg | 230 | 1840 | 370 | 550 |
| | 0.43 g | 0.25 g | 1.09 mg | 190 | 990 | 280 | 400 |
| I-3 | | | | | | |
| | 0.52 g | 0.25 g | 1.09 g | 120 | 3640 | 170 | 1790 |
| I-4 | | | | | | |
| | 0.88 g | none | 2.17 mg | 300 | 270 | 370 | 170 |
| | 0.44 g | 0.25 g | 1.09 mg | 240 | 180 | 350 | 85 |

COMPARATIVE EXAMPLE 1

By using 0.92 g ($2 \times 10^{-3}$ mole) of the compound having Formula (V), as used in Example 2 for obtaining the reference data, 60 mg of polycarbonate of bisphenol A, and $2 \times 10^{-5}$ mole of the same sensitizing dye as used in Example 41, a photoconductive member was prepared in the same manner as in Example 40. Its initial potential and exposure amount were measured, and the results are shown below.

[Structure of compound (V): bis(diethylamino)-substituted triphenylmethane with para-N(CH3)2 group]

| Positive Charging | | Negative Charging | |
| --- | --- | --- | --- |
| Initial Potential (V) | Half-decay Exposure Amount (lux . sec) | Initial Potential (V) | Half-decay Exposure Amount (lux . sec) |
| 165 | $1.6 \times 10^2$ | −252 | $1.3 \times 10^2$ |

As is apparent from the results of Example 41 and Comparative Example 1, the half-decay exposure amount in the photoconductive member of Example 41 using the triphenylmethane polymer is much lower compared with that of Comparative Example 1 using the compound (V) and polycarbonate of bisphenol A.

COMPARATIVE EXAMPLE 2

By using 0.47 g of the compound having Formula (VI), as used in Example 36 for obtaining the reference data, 0.25 g of polycarbonate of bisphenol A and 1.09 g of the same dye as used in Example 43 (Dye (VIII)), a photoconductive member was prepared in the same manner as in Example 44. The results are shown below.

| Positive Charging | | Negative Charging | |
| --- | --- | --- | --- |
| Initial Potential (V) | E½ (lux . sec) | Initial Potential (V) | E½ (lux . sec) |
| 210 | 1640 | 440 | 380 |

As is apparent from the results of Example 43 and Comparative Example 2, the half-decay exposure amount of the photoconductive member of Example 43 using the triphenylenemethane polymer is much lower compared with that of Comparative Example 2 using the compound VI and polycarbonate of bisphenol A.

While the invention has been described in detail and with reference to specific embodiments thereof, it will be apparent to one skilled in the art that various changes and modifications can be made therein without departing from the spirit and scope thereof.

What is claimed is:

1. A triphenylmethane polymer represented by formula (I)

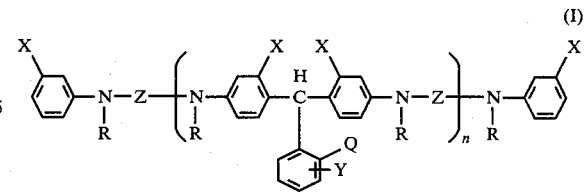

wherein R is an alkyl group, X is H or a methyl group, Z is an alkylene group having 1 to 5 carbon atoms or a p-xylylene group, Y is H, a methyl group, a methoxy group, a tertiary amino group, halogen, a nitro group, or a cyano group, Q is H or a methyl group, and n represents a polymerization degree sufficient to obtain an intrinsic viscosity of the polymer from 0.005 to 1.000.

2. A triphenylmethane polymer as in claim 1 wherein R represents an alkyl group having from 1 to 5 carbon atoms, X is H, or a methyl group, Y is H, a methyl group, a methoxy group, a tertiary amino group substituted by an alkyl group containing 1 or 2 carbon atoms, halogen, a nitro group or a cyano group, Q is H or a methyl group.

3. A process for producing a triphenylmethane polymer represented by formula (I)

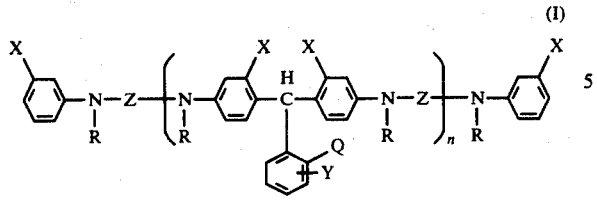
(I)

wherein R is an alkyl group, X is H or a methyl group, Z is an alkylene group having 1 to 5 carbon atoms or a p-xylylene group, Y is H, a methyl group, a methoxy group, a tertiary amino group, halogen, a nitro group os a cyano group, Q is H or a methyl group, and n represents a polymerization degree sufficient to obtain an intrinsic viscosity [ρ] of the polymer from 0.005 to 1.000 said process comprising condensing a N,N'-substituted alkylenebisaniline compound with an aldehyde.

4. A process as in claim 3 wherein the N,N'-substituted alkylenebisaniline derivative is a compound represented by formula (II)

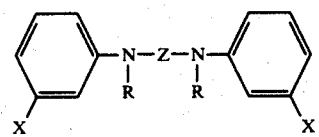
(II)

wherein R is an alkyl group, and X is H or a methyl group.

5. A process as in claim 4 wherein the N,N'-substituted alkylenebisaniline is N,N'-dimethyl-N,N'-diphenylethylenediamine, N,N'-dimethyl-N,N'-diphenylpropylenediamine, N,N'-diethyl-N,N'-diphenylethylenediamine, N,N'-diethyl-N,N'-diphenylpropylenediamine, N,N'-dimethyl-N,N'-di(m-tolyl)ethylenediamine, N,N'-diethyl-N,N'-di(m-tolyl)ethylenediamine, N,N'-diethyl-N,N'-di(m-tolyl)propylenediamine, N,N'-diethyl-N,N'-di(m-tolyl)xylylenediamine, or N,N'-dimethyl-N,N'-di(m-tolyl)propylenediamine.

6. A process as in claim 4 wherein the aldehyde is a compound represented by formula (III)

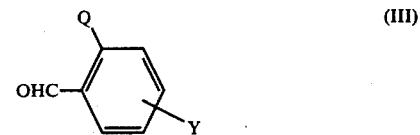
(III)

wherein Y is H, a methyl group, a methoxy group, a tertiary amino group, halogen, a nitro group or a cyano group, and Q is H or a methyl group.

7. A process as in claim 6 wherein the aldehyde is a para-substituted, meta-substituted or ortho-substituted compound of diethylaminobenzaldehyde, dimethylaminobenzaldehyde, methoxybenzaldehyde, nitrobenzaldehyde, cyanobenzaldehyde, chlorobenzaldehyde, bromobenzaldehyde, or tolualdehyde or is 2-methyl-4-(dimethylamino)-benzaldehyde, 2-methyl-4-(diethylamino)benzaldehyde.

8. A process as in claim 3 wherein the reaction is carried out in polyphosphoric acid.

9. A triphenylmethane polymer as in claim 1 or 2 wherein the alkyl group represented by R contains from 1 to 3 carbon atoms.

10. A triphenylmethane polymer as in claim 9 wherein the alkylene group represented by Z contains 2 to 3 carbon atoms.

11. A process according to claim 3, 4, 5, 6, 7, or 8 wherein the reaction temperature is from 50° to 200° C. and the reaction period is from 10 minutes to 20 hours.

12. A process as in claim 11 wherein the reaction temperature is from 100° to 150° C. and the reaction period is from 1 hour to 8 hours.

13. A process as in claim 8 wherein the polyphosphoric acid is present in an amount from 5 to 30 g/g of N,N'-alkylenebisaniline.

14. A process as in claim 8 wherein the polyphosphoric acid is present in an amount from 8 to 15 g/g of N,N'-alkylenebisaniline.

15. A process as in claim 3 wherein the alkylene group represented by Z contains 2 to 3 carbon atoms.

16. A process as in claim 4 wherein the alkylene group represented by Z contains 2 to 3 carbon atoms.

* * * * *